(12) United States Patent
Wolf et al.

(10) Patent No.: US 12,049,123 B2
(45) Date of Patent: Jul. 30, 2024

(54) CLIMATE CONTROL SYSTEM WITH A CONTROLLED EJECTOR

(71) Applicant: Volkswagen Aktiengesellschaft, Wolfsburg (DE)

(72) Inventors: Jessica Wolf, Lehre (DE); Philipp Sawall, Hildesheim (DE); Heino Schiller, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/993,030

(22) Filed: Nov. 23, 2022

(65) Prior Publication Data
US 2023/0158861 A1 May 25, 2023

(30) Foreign Application Priority Data
Nov. 24, 2021 (DE) ..................... 10 2021 213 208.1

(51) Int. Cl.
*B60H 1/00* (2006.01)
*B60H 1/32* (2006.01)
*F25B 9/00* (2006.01)

(52) U.S. Cl.
CPC ......... *B60H 1/00899* (2013.01); *F25B 9/008* (2013.01); *B60H 2001/3298* (2013.01)

(58) Field of Classification Search
CPC ........ B60H 1/00899; B60H 2001/3298; B60H 1/3228; B60H 1/32284; B60H 1/00328; F25B 9/008; F25B 6/04; F25B 2341/0011; F25B 2400/0407; F25B 41/20; F25B 5/02; F25B 6/02; F25B 40/00; F25B 2309/061; F25B 2400/23; F25B 41/00; F25B 2341/0012; F25B 2341/0015; F25B 2600/2501; F25B 9/08; F25B 41/40; F25B 43/00
See application file for complete search history.

(56) References Cited

U.S. PATENT DOCUMENTS 3,701,264 A * 10/1972 Newton ................. F25B 41/00
                                                            62/191
7,254,961 B2    8/2007 Oshitani et al.
(Continued)

FOREIGN PATENT DOCUMENTS

CN        103808101 A    5/2014
CN        110345690 B    5/2020
(Continued)

*Primary Examiner* — Kun Kai Ma
(74) *Attorney, Agent, or Firm* — Muncy, Geissler, Olds & Lowe, P.C.

(57) ABSTRACT

In order to provide climate control system for heating or cooling a space, in particular a vehicle interior, having a compressor for conveying a refrigerant, which can efficiently use the refrigerant $CO_2$ for heat pump applications as well, it is proposed to arrange a high-pressure chiller for cooling the refrigerant downstream of the compressor and a low-pressure chiller for heating the refrigerant upstream of the compressor, wherein a refrigerant exiting from the high-pressure chiller can be supplied to a motive mass inlet of a first ejector and a refrigerant exiting from the low-pressure chiller can be supplied to a suction mass inlet of the first ejector, and wherein an outlet of the first ejector is connected directly or indirectly to a liquid separator.

8 Claims, 21 Drawing Sheets

(56) References Cited

U.S. PATENT DOCUMENTS

| | | |
|---|---|---|
| 7,428,826 B2 | 9/2008 | Oshitani et al. |
| 7,707,849 B2 | 5/2010 | Ishizaka et al. |
| 7,726,150 B2 | 6/2010 | Nishijima et al. |
| 10,018,386 B2 | 7/2018 | Nishijima et al. |
| 2004/0123624 A1 | 7/2004 | Ohta et al. |
| 2011/0100038 A1 | 5/2011 | Haussmann |
| 2012/0167601 A1* | 7/2012 | Cogswell ............... F25B 41/22 62/115 |
| 2019/0128569 A1 | 5/2019 | Tada et al. |

FOREIGN PATENT DOCUMENTS

| | | | |
|---|---|---|---|
| DE | 102008005076 A1 | 7/2009 | |
| DE | 102008011255 A1 | 9/2009 | |
| DE | 112014002876 T5 | 3/2016 | |
| DE | 112017003076 T5 | 2/2019 | |
| JP | 2007078318 A | 3/2007 | |
| JP | 2008082614 A | 4/2008 | |
| JP | 2019190795 A * | 10/2019 | |
| WO | WO-2012012493 A2 * | 1/2012 | ............... F25B 1/06 |
| WO | WO-2012012501 A2 * | 1/2012 | ............. F25B 40/00 |
| WO | WO-2013140990 A1 * | 9/2013 | ............. F25B 40/00 |
| WO | WO-2014158468 A1 * | 10/2014 | ............. F04D 25/06 |
| WO | WO-2015029346 A1 * | 3/2015 | ......... B60H 1/00021 |
| WO | WO-2015119903 A1 * | 8/2015 | ................ F25B 1/00 |
| WO | WO-2017007585 A1 * | 1/2017 | ................ F04F 5/46 |
| WO | WO-2018118609 A1 * | 6/2018 | ............. F25B 41/00 |
| WO | WO2018159322 A1 | 9/2018 | |

\* cited by examiner

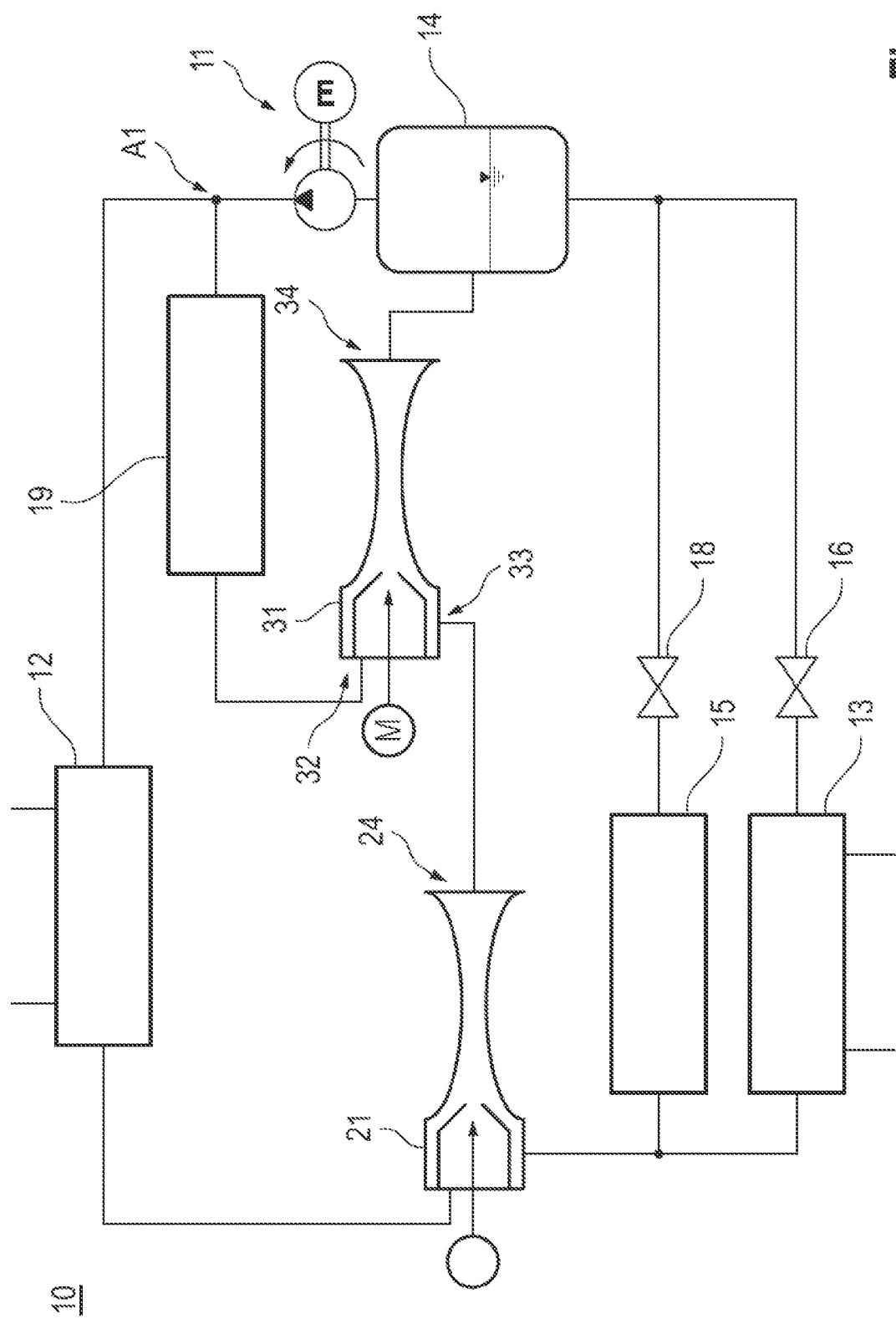

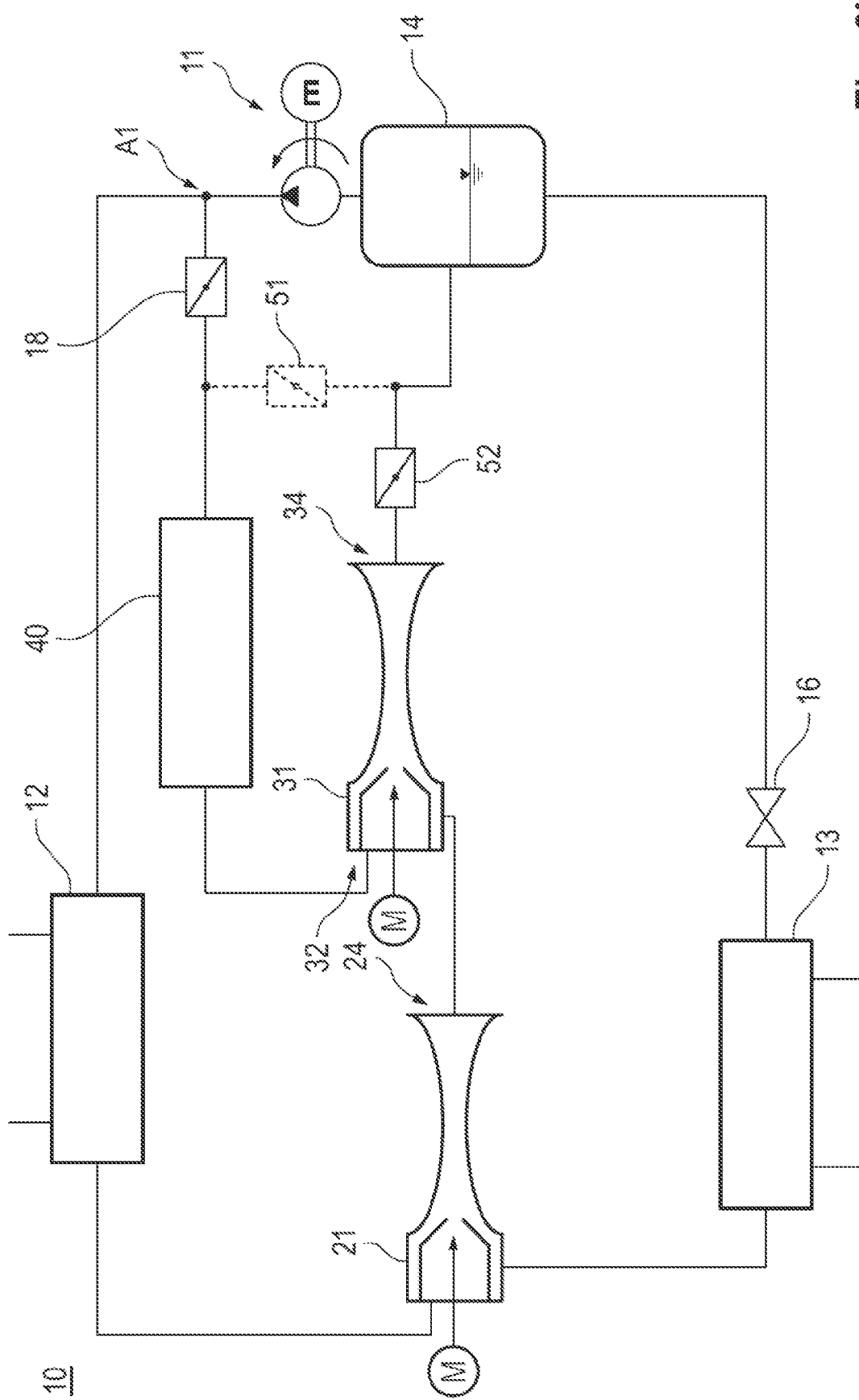

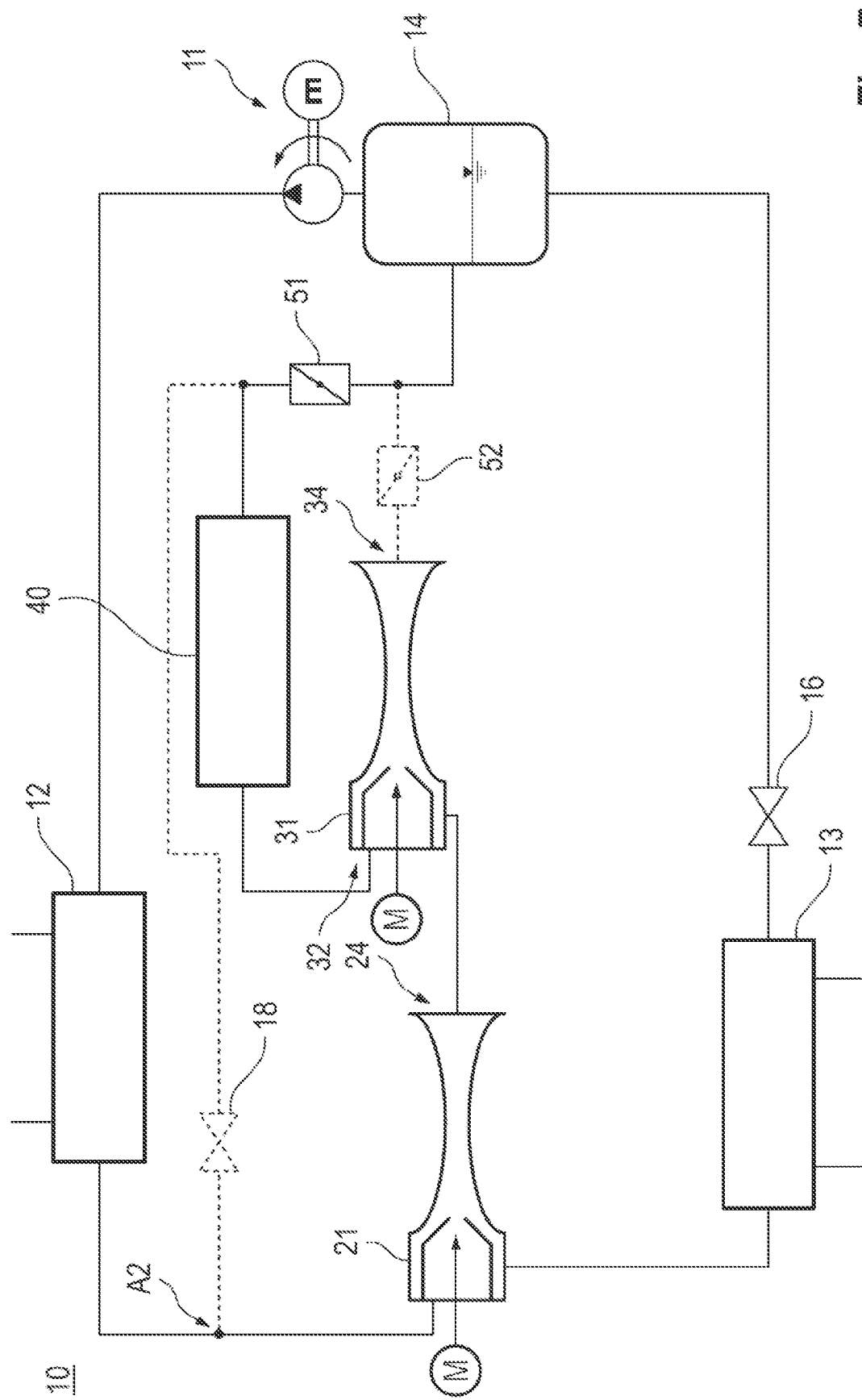

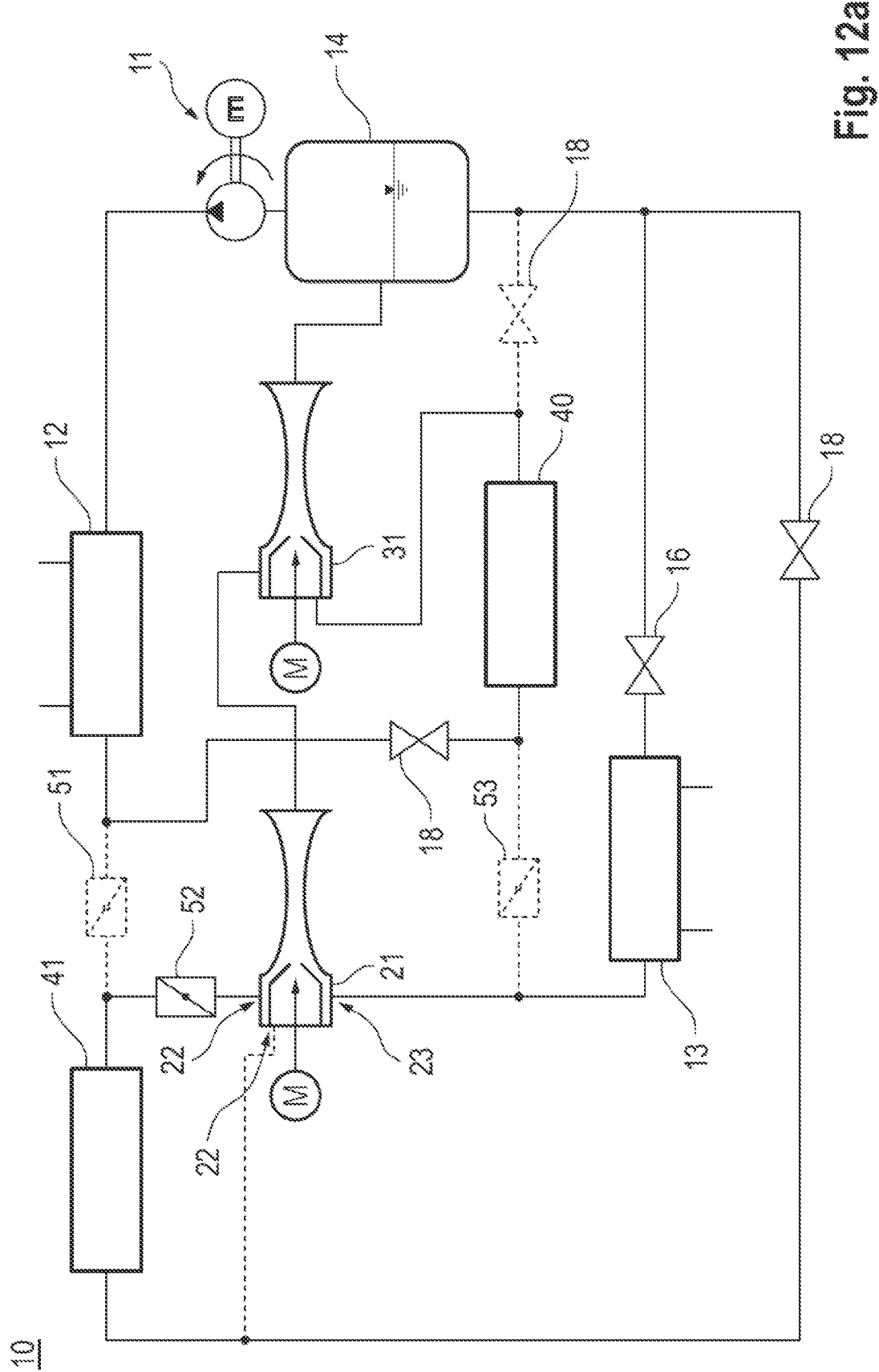

CLIMATE CONTROL SYSTEM WITH A CONTROLLED EJECTOR

This nonprovisional application claims priority under 35 U.S.C. § 119(a) to German Patent Application No. 10 2021 213 208.1, which was filed in Germany on Nov. 24, 2021, and which is herein incorporated by reference.

BACKGROUND OF THE INVENTION

Field of the Invention

The present invention relates to a climate control system for heating or cooling a space, in particular a vehicle interior, having a compressor for conveying a refrigerant, and to a motor vehicle with a climate control system of this kind.

Description of the Background Art

Air conditioning systems are already known that operate with $CO_2$ as the refrigerant. Air conditioning systems of this kind are currently limited in their performance at high outdoor temperatures. In addition, alternative refrigerants with a better performance, such as R1234YF, are used in air conditioning systems. However, refrigerants of this kind are not environmentally neutral and, depending on the situation, can be flammable and compromise safety. Furthermore, refrigerants such as R1234YF have limited use in a heat pump mode.

U.S. Pat. No. 7,428,826 B2 describes an ejector device that controls a refrigerant inflow to a first and a second evaporator. U.S. Pat. No. 7,726,150 B2 also discloses an ejector device of this kind.

A refrigerant circuit with an ejector is known from U.S. Pat. No. 7,254,961 B2. The ejector is located downstream of a heat exchanger or condenser and serves as a decelerator for the refrigerant.

WO 2018/159322 A1 describes an ejector with an adjustable nozzle opening by means of a movable needle.

JP 2008-082614 A discloses an air conditioning system with an ejector. The air conditioning system has a plurality of compressors to increase the cooling capacity.

U.S. Pat. No. 7,707,849 B2 discloses a refrigerant circuit with an ejector. The ejector is formed integrally with a first evaporator, a second evaporator, and an adjusting mechanism.

SUMMARY OF THE INVENTION

It is therefore an object of the present invention to provide a climate control system that can efficiently use the refrigerant $CO_2$ for heat pump applications as well. In particular, it is the object of the invention to provide a climate control system that can be reliably operated with $CO_2$ as the refrigerant even under extreme climatic conditions.

According to an exemplary embodiment of the invention, a climate control system is provided for heating or cooling a space, in particular a vehicle interior. The climate control system has a compressor for conveying a refrigerant. For example, the refrigerant can be $CO_2$. However, the climate control system is not limited to $CO_2$ as a refrigerant. In particular, R1234yf, propane, butane, or mixtures of propane and butane, or mixtures of $CO_2$ and the like can be used as refrigerants by the climate control system.

The climate control system further comprises a high-pressure chiller, a low-pressure chiller, a liquid separator or economizer, and a controlled first ejector.

A high-pressure chiller for cooling the refrigerant is located downstream of the compressor and a low-pressure chiller for heating the refrigerant is located upstream of the compressor. Alternatively, a gas cooler and/or an interior condenser can be provided instead of the high-pressure chiller to implement the corresponding function.

A refrigerant exiting from the high-pressure chiller or the gas cooler and/or the interior condenser can be supplied to a motive mass inlet of a first controlled ejector, and a refrigerant exiting from the low-pressure chiller can be supplied to a suction mass inlet of the first ejector. Furthermore, an outlet of the first ejector is connected directly or indirectly to a liquid separator.

According to a further aspect of the invention, a motor vehicle is provided which has a climate control system of the invention.

For example, the climate control system can be operated as a $CO_2$ air conditioning system, which has increased efficiency. An electric vehicle equipped with such a climate control system can thus benefit from an increase in range. In this context, the climate control system enables the reliable use of $CO_2$ as a refrigerant even under extreme climatic conditions.

The first ejector can be designed as a controlled ejector. A motive mass flow, which has an increased pressure compared to a suction mass flow, can be provided at the motive mass inlet of the first ejector. The motive mass flow can thus be accelerated by the suction mass flow in an annular gap between a nozzle and a needle of the ejector. The momentum of the motive mass flow is transferred to the suction mass flow after passing the nozzle. Both mass flows mix in this case. The cross section increases in the downstream diffuser of the first ejector, as a result of which the velocity of the resulting total mass flow declines and the pressure increases above the level of the suction mass flow. The diffuser forms the outlet of the first ejector.

The size of the annular gap is adapted to requirements and boundary conditions by an axial displacement of the needle relative to the nozzle. Thus, a variable nozzle cross section can be realized. Proportional solenoids with a position sensor system, stepper motors with spindle gears, DC motors with spindle gears, or actuators based on shape-memory alloys can be used as actuators for controlling the first ejector.

More preferably, the climate control system can be used in combined air conditioning and heat pump systems in electric vehicles or BEVs. In this case, in particular, carbon dioxide or $CO_2$ can be used as a refrigerant, which is usable in the air conditioning mode and heat pump mode.

Due to the structure of the climate control system and the properties of $CO_2$, different phase states and phase changes occur within the ejector. This can result in pressure surges or pulsations. Operating points with shock waves or pulsations in the 2-phase ejector can be avoided due to the variability of the nozzle cross section.

Furthermore, an increased temperature delta between the evaporator or the high-pressure chiller and the condenser or the low-pressure chiller can be utilized by means of the climate control system.

The efficiency of the climate control system can be increased if the outlet of the first ejector is indirectly connected to the liquid separator via an interior evaporator. For example, a cooling output can be supplied to the vehicle interior hereby before the refrigerant reaches the liquid separator. In the liquid separator, which is preferably designed as a so-called economizer, the refrigerant can be separated into its gaseous and liquid components. The gaseous components of the refrigerant are then conveyed or guided in the direction of the compressor and the liquid components of the refrigerant in the direction the low-pressure chiller.

According to a further exemplary embodiment, an interior evaporator can be connected in parallel to the low-pressure chiller, wherein an expansion valve can be connected upstream of the interior evaporator and/or low-pressure chiller. By connecting an expansion valve upstream, the inflow of the at least partially condensed refrigerant to the low-pressure chiller and/or the interior evaporator can be precisely controlled. In the interior evaporator in particular, the refrigerant, which is partially or completely in the liquid phase, can be evaporated again, as a result of which additional cooling output is generated.

The refrigerant inflow to the first ejector can be precooled if a refrigerant outlet of the high-pressure chiller or the gas cooler is thermally coupled to a refrigerant inlet of the compressor, in particular via an interior heat exchanger. An optional gas cooler in the front end can also be omitted due to this measure.

The low-pressure chiller and the high-pressure chiller are acted upon thermally by cooling water or heating water, respectively, in order to heat or cool the passing refrigerant. The corresponding heat transfer between the ambient air and refrigerant thus takes place via the cooling water. The efficiency losses due to the heat transfer via the cooling water are compensated by the efficiency increase of the climate control device.

The outlet of the first ejector can be indirectly connected to the liquid separator via a second ejector, wherein the outlet of the first ejector is connected to a suction mass inlet of the second ejector and the outlet of the second ejector is connected to the liquid separator. Further components, in particular interior evaporators or interior condensers, can be integrated into the climate control system due to this measure. The second ejector is preferably also designed as a controlled ejector analogous to the design of the first ejector. As a result, the refrigerant flow can be controlled independently of the first ejector by the additional integrated component.

The climate control system can be used in a particularly versatile manner if a branch arranged downstream of the compressor or a branch arranged upstream of the compressor, in particular downstream of the liquid separator, or a branch arranged downstream of the high-pressure chiller is connected directly or via an interior condenser or via an interior heat exchanger to a motive mass inlet of the first ejector or the second ejector.

The outlet of the first ejector can be connected to a motive mass inlet of the second ejector, wherein a refrigerant flows through an interior heat exchanger that is branched off upstream of the low-pressure chiller and is connected to the suction mass inlet of the first ejector; or wherein the interior heat exchanger is flowed through by a refrigerant branched off downstream of the high-pressure chiller and is connected to the suction mass inlet of the second ejector. As a result, the interior heat exchanger can be connected either to the high-pressure side or to the low-pressure side of the refrigerant in order to supply a heat output or a cooling output to the space, in particular the vehicle interior.

The climate control system can also be optimally used with $CO_2$ as the refrigerant for hot climate applications if a gas cooler can be connected between the refrigerant outlet of the high-pressure chiller and the motive mass inlet of the first ejector or between the refrigerant outlet of the liquid separator and the motive mass inlet of the first ejector.

Moreover, increased comfort requirements, which have a higher demand for a cooling output, can also be reliably implemented by the additional gas cooler.

A refrigerant outlet of a gas cooler can be connected to the motive mass inlet of the second ejector. Depending on the design of the climate control system, the gas cooler can basically be used for heat transfer in any direction. Thus, the gas cooler can be used to remove heat from the refrigerant or to supply heat to the refrigerant.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 5 shows a schematic representation of a climate control device according to a fifth exemplary embodiment;

FIGS. 6a and 6b show schematic representations of a climate control device according to a sixth exemplary embodiment in a cooling mode and in a heating mode;

FIGS. 7a and 7b shows schematic representations of a climate control device according to a seventh exemplary embodiment in a cooling mode and in a heating mode;

FIGS. 12a and 12b show schematic representations of a climate control device according to a twelfth exemplary embodiment in an air conditioning mode and in a heating mode.

DETAILED DESCRIPTION

Figure 1:
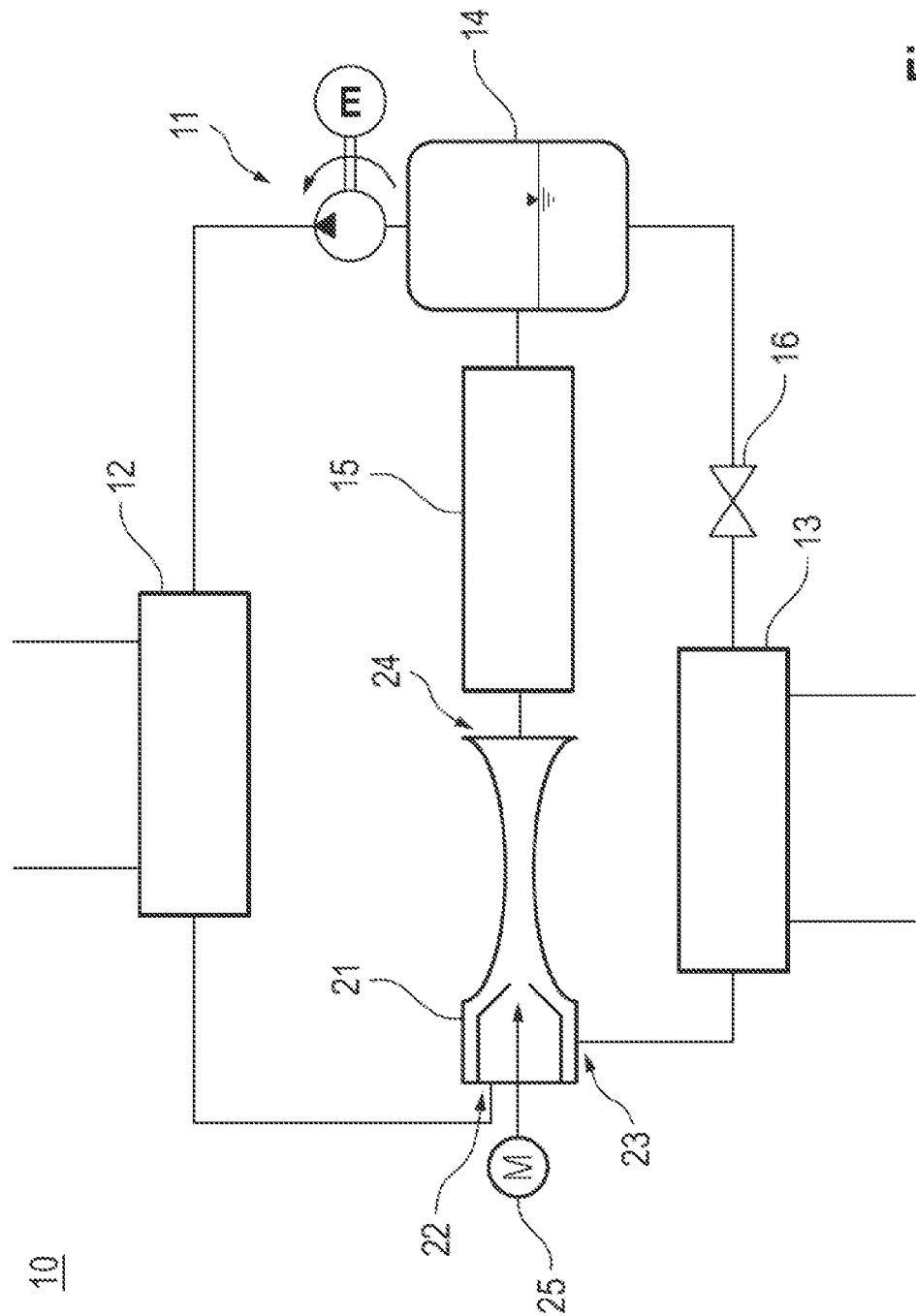
FIG. 1 shows a schematic representation of a climate control device according to a first exemplary embodiment.
Figure 13:
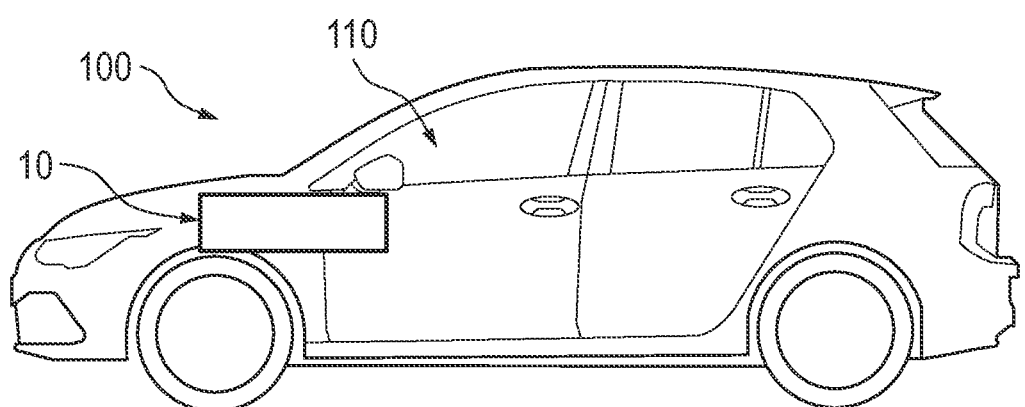
FIG. 13 shows a side view of a motor vehicle of the invention according to an exemplary embodiment with a climate control device.

FIG. 1 shows a schematic representation of a climate control device 10 according to a first exemplary embodiment. Climate control system 10 is used to heat or cool an exemplary vehicle interior 110, which is illustrated in FIG. 13.

Climate control system 10 has a compressor 11 for conveying a refrigerant. For example, $CO_2$ can be used as the refrigerant. In the illustrated exemplary embodiment, compressor 11 is designed as an electrically driven compressor.

Downstream of compressor 11, a high-pressure chiller 12 is provided for cooling the refrigerant or removing heat from the refrigerant to a water cooling circuit.

Analogous to high-pressure chiller 12, a low-pressure chiller 13 is provided upstream of compressor 11 for heating the refrigerant or for removing heat output from the thermally coupled water cooling circuit.

A refrigerant exiting high-pressure chiller 12 is supplied to a motive mass inlet 22 of a first ejector 21, and a refrigerant exiting from low-pressure chiller 13 is supplied to a suction mass inlet 23 of first ejector 21.

In the illustrated exemplary embodiment, an outlet 24 of first ejector 21 is indirectly connected to a liquid separator 14 via an interior evaporator 15. Interior evaporator 15 is preferably thermally coupled to vehicle interior 110 and can, for example, have air flowing therethrough from an interior fan.

Liquid separator 14 is designed as an economizer and can separate the liquid phase from the gaseous phase of the refrigerant. Accordingly, the gaseous phase can be guided in the direction of compressor 11 and the liquid phase to low-pressure chiller 13.

First ejector 21 is designed as a controlled ejector and has an electric drive 25. Electric actuator 25 is used to adjust a cross section of an annular gap, with which the velocity or a volumetric flow rate of the motive mass flow supplied through motive mass inlet 22 is adjusted.

Furthermore, an expansion valve 16 is arranged between liquid separator 14 and low-pressure chiller 13 in order to evaporate and thus to cool the refrigerant supplied in the liquid phase to low-pressure chiller 13.

Figure 2:
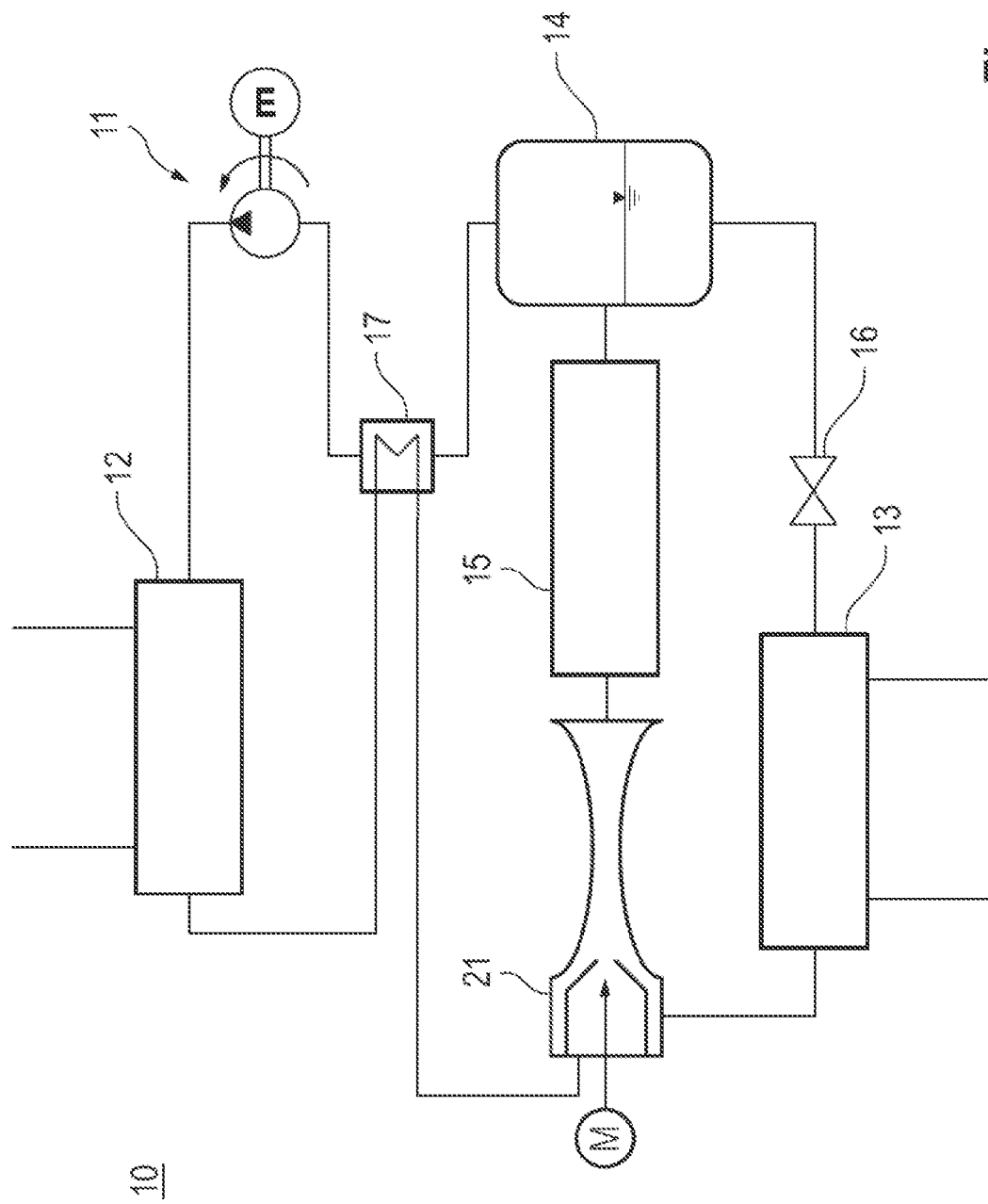
FIG. 2 shows a schematic representation of a climate control device according to a second exemplary embodiment.

A schematic representation of a climate control device 10 according to a second exemplary embodiment is illustrated in FIG. 2. In contrast to the first exemplary embodiment, an interior heat exchanger 17 is provided here, which thermally couples a refrigerant outlet of high-pressure chiller 12 to a refrigerant inlet of compressor 11.

Figure 3:
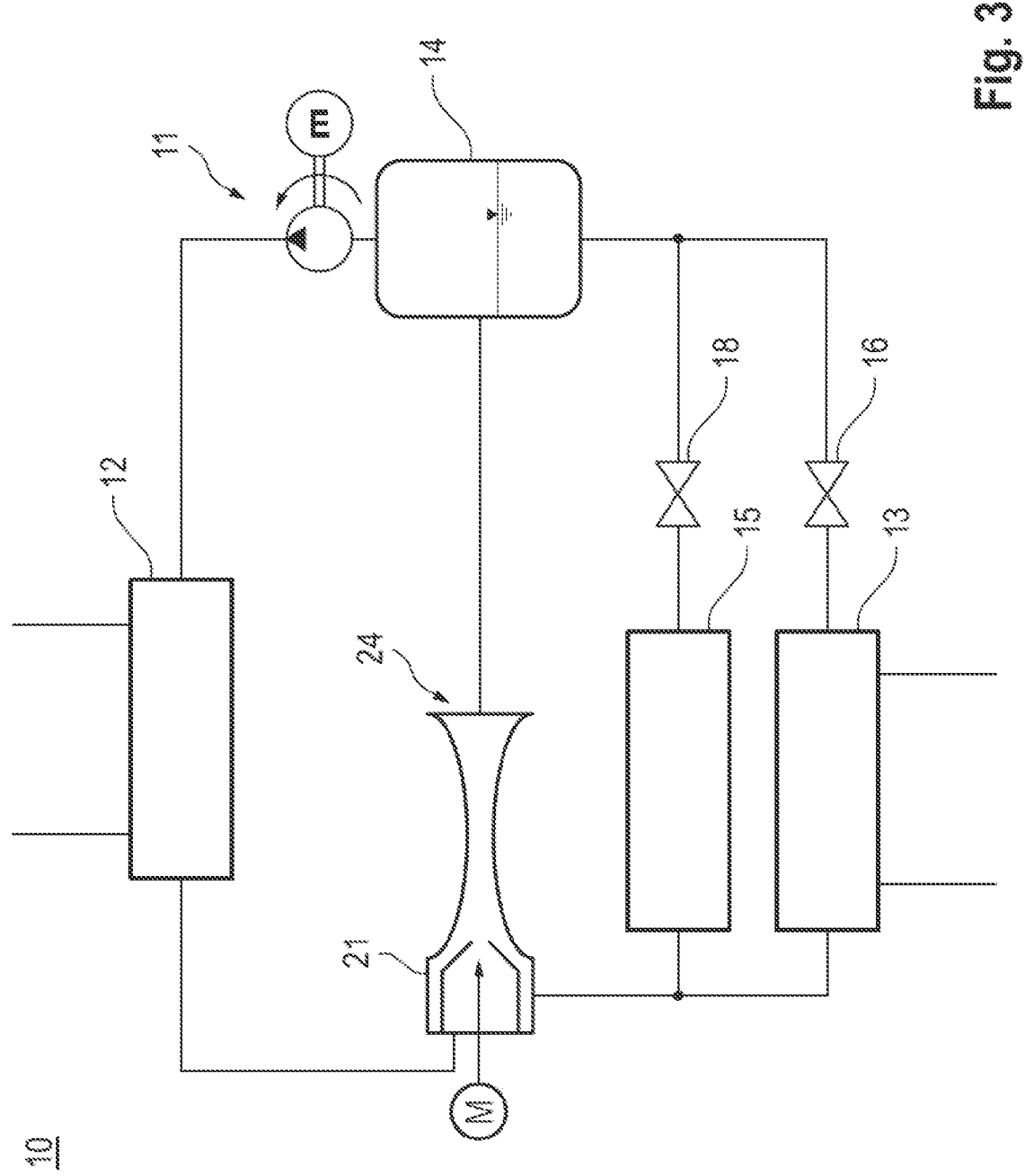
FIG. 3 shows a schematic representation of a climate control device according to a third exemplary embodiment.

FIG. 3 shows a schematic representation of a climate control device 10 according to a third exemplary embodiment. Climate control device 10 according to a third exemplary embodiment is based on the exemplary embodiments already described, but interior evaporator 15 is arranged in parallel to low-pressure chiller 13. In this case, an expansion valve 18 is connected upstream of interior evaporator 15, analogous to low-pressure chiller 13.

Because interior evaporator 15 is arranged at a new position, first ejector 21, in particular outlet 24 of first ejector 21, can be connected proximately or directly to liquid separator 14.

Figure 4:
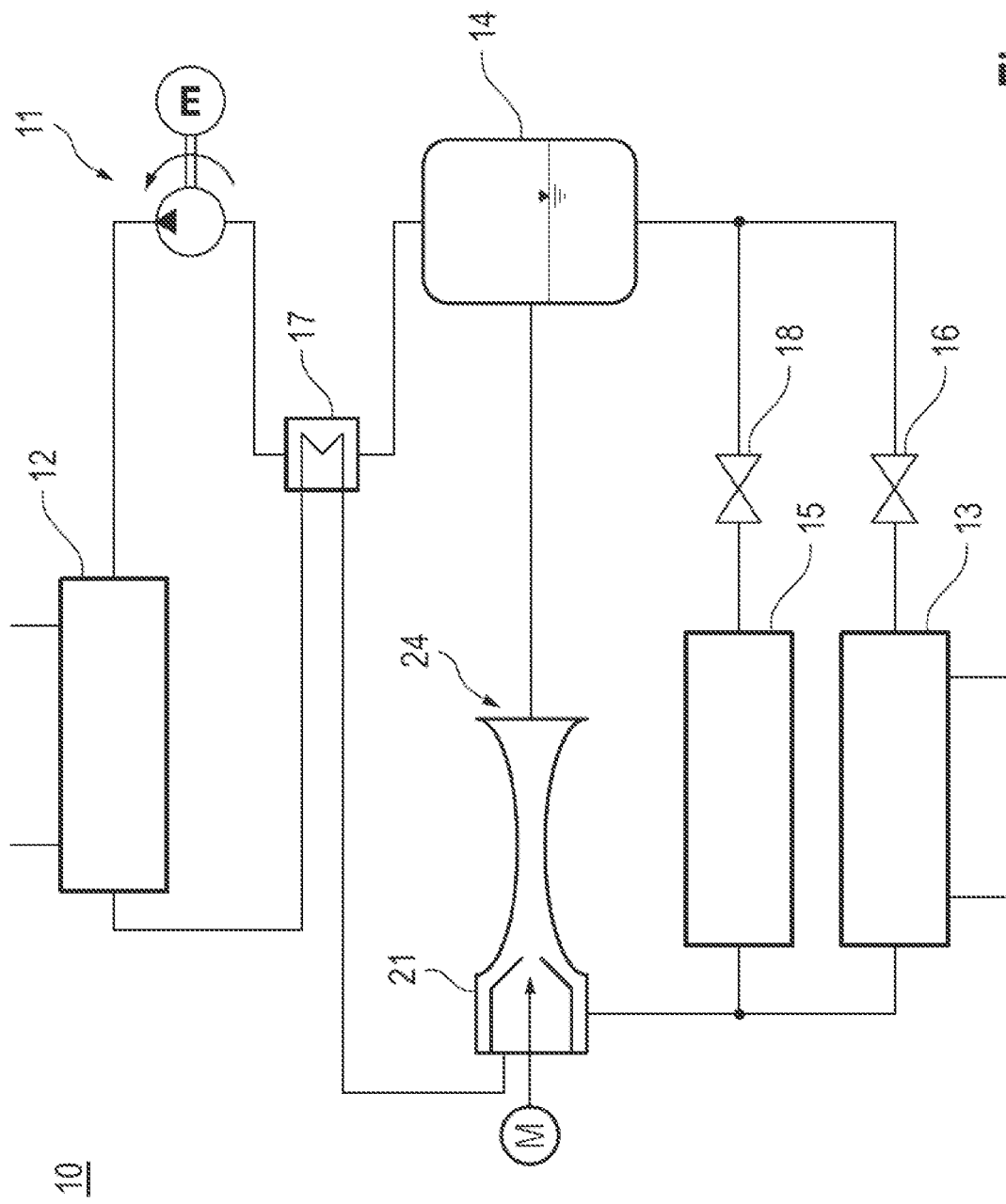
FIG. 4 shows a schematic representation of a climate control device according to a fourth exemplary embodiment.

FIG. 4 shows a schematic representation of a climate control device 10 according to a fourth exemplary embodiment, which is based on the second exemplary embodiment. In this case, in the fourth exemplary embodiment, analogous to the third exemplary embodiment, interior evaporator 15 has been moved downstream of liquid separator 14 and in parallel to low-pressure chiller 13. There is also an interior heat exchanger 17, which thermally couples the refrigerant outlet of high-pressure chiller 12 to the refrigerant inlet of compressor 11.

FIG. 5 illustrates in a schematic representation a climate control device 10 according to a fifth exemplary embodiment. Climate control device 10 according to the fifth exemplary embodiment is based on the third exemplary embodiment and has an interior condenser 19.

Interior condenser 19 is placed downstream of compressor 11, in parallel to high-pressure chiller 12.

Furthermore, outlet 24 of first ejector 21 opens into a suction mass inlet 33 of a second ejector 31. Interior condenser 19 is connected to a motive mass inlet 32 of second ejector 31. Finally, an outlet 34 of second ejector 31 opens into liquid separator 14. Thus, first ejector 21 is indirectly connected to liquid separator 14 via second ejector 31.

Second ejector 31 is designed as a controlled ejector, analogous to first ejector 21.

In the fifth exemplary embodiment, a branch A1 arranged downstream of the compressor is indirectly connected to motive mass inlet 23 of second ejector 31 via interior condenser 19.

Thus, an interior condenser 19 is arranged in parallel to high-pressure chiller 12 and is set up to heat a supply air of vehicle interior 110. The second jet pump or second ejector 31 is used to control the application and utilization of the expansion work.

In the fifth exemplary embodiment, heating as well as cooling and reheating are realized by direct heat transfer from the climate control circuit to the interior air.

Figure 6A:
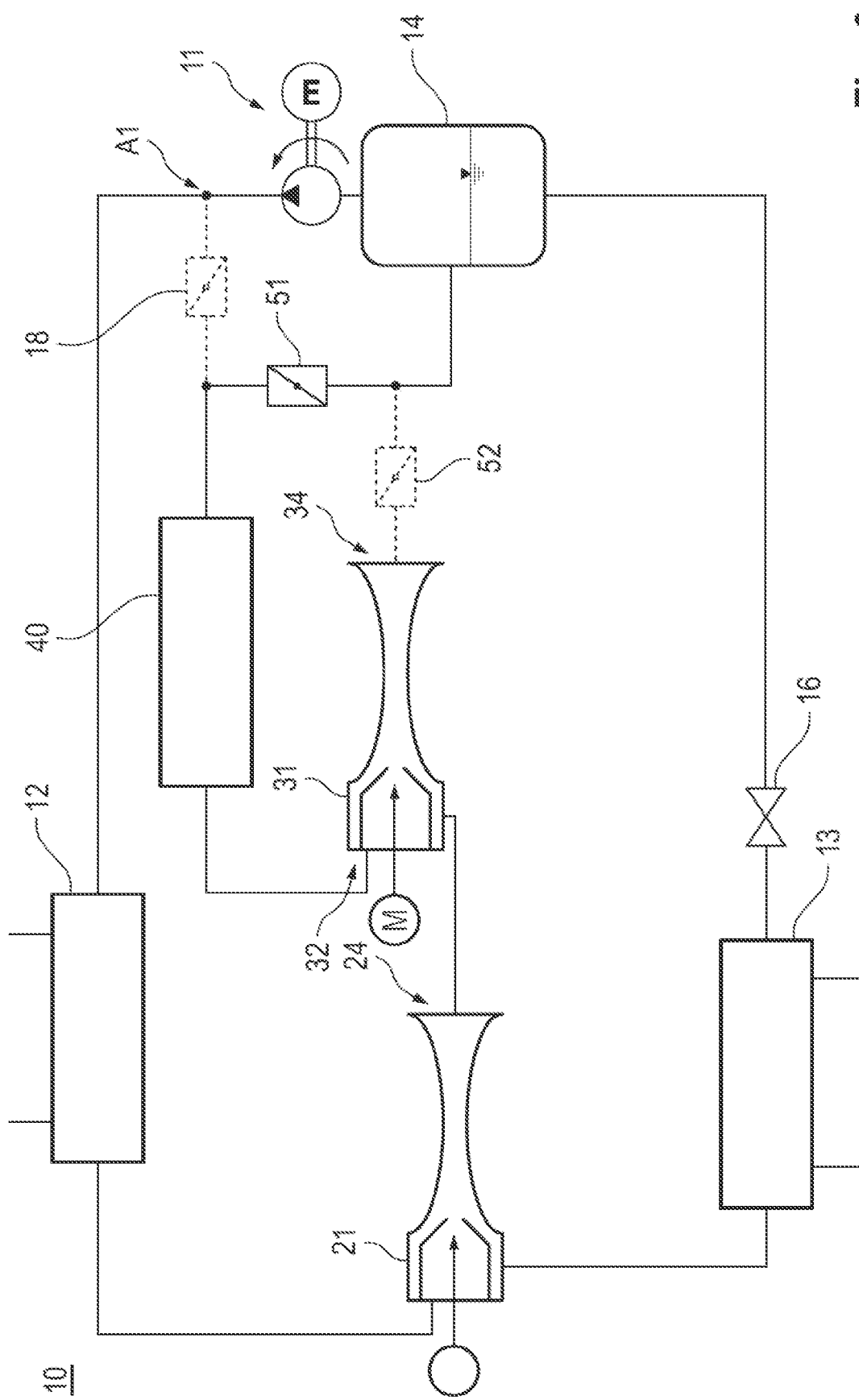

FIG. 6a and FIG. 6b show schematic representations of a climate control device 10 according to a sixth exemplary embodiment in a cooling mode and in a heating mode. Here, FIG. 6a shows climate control device 10 in a cooling mode or air conditioning mode, and FIG. 6b shows the climate control device in a heating mode.

The sixth exemplary embodiment is based on the first exemplary embodiment and was expanded by second ejector 31 and an interior heat exchanger 40. Interior heat exchanger 40 is arranged in parallel to second ejector 31 and is connected to motive mass inlet 32 of second ejector 31. In the cooling mode, interior heat exchanger 40 is coupled to second ejector 31 via liquid separator 14.

To realize the heating mode, it is necessary to connect interior heat exchanger 40 via a branch A1 located downstream of the compressor. In both operating modes, interior heat exchanger 40 opens into motive mass inlet 32 of second ejector 31. An expansion valve 18 is positioned in branch A1.

The switching of the operating modes occurs via two valves 51, 52.

Optionally, a water heat exchanger or an air heater for the interior air can be provided to ensure the reheating mode for drying air in vehicle interior 110.

The exemplary embodiments shown in the figures explain the principle, for the sake of simplicity, using a motor vehicle 100 (see FIG. 13). However, climate control system 10 is not limited to use in motor vehicles 100.

Figure 7B:
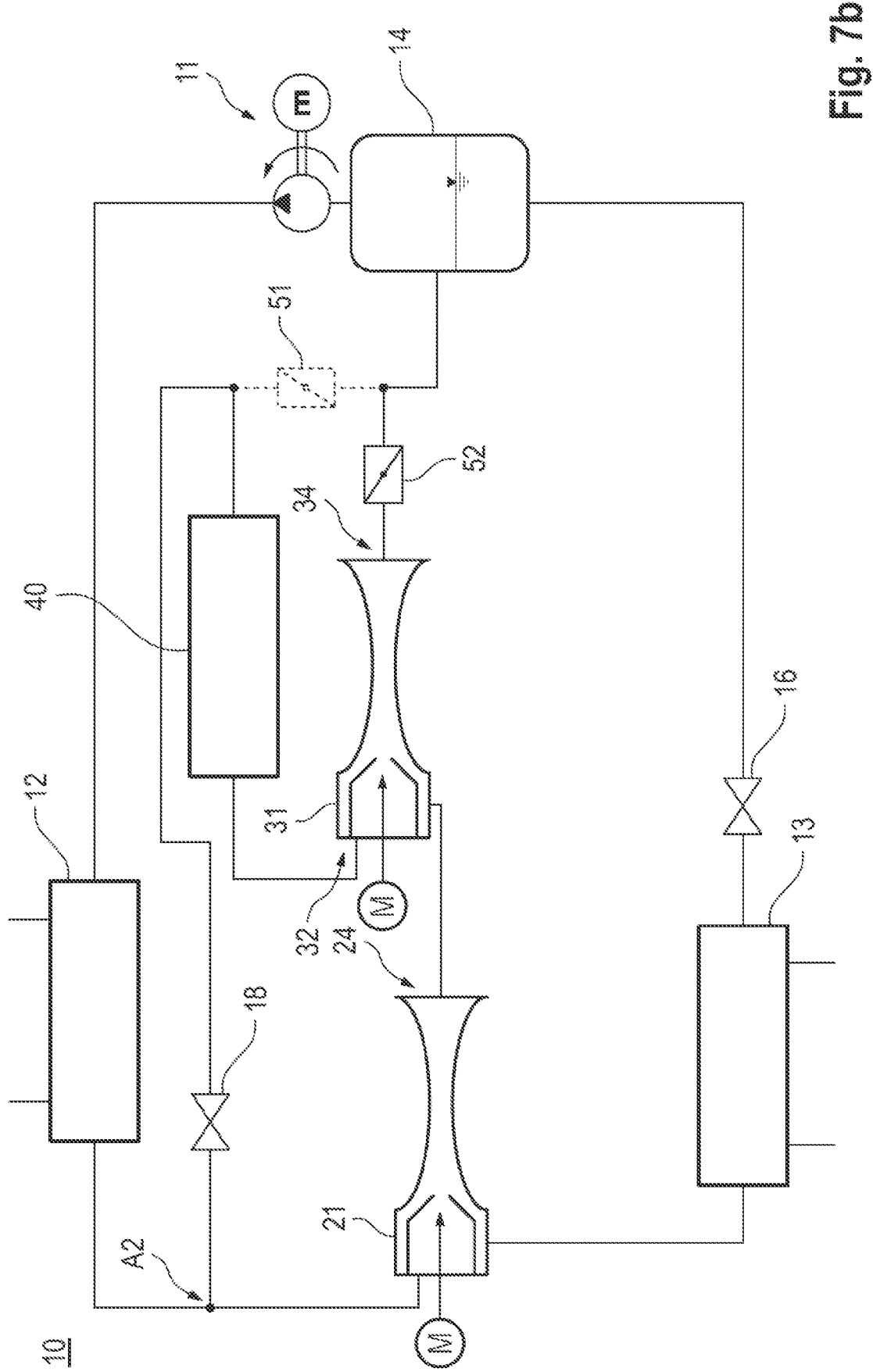

Schematic representations of a climate control device according to a seventh exemplary embodiment in a cooling mode and in a heating mode are shown in FIG. 7a and FIG. 7b. The seventh exemplary embodiment substantially corresponds to the sixth exemplary embodiment. In particular, the operating mode shown in FIG. 7a for cooling the vehicle interior 110 by means of interior heat exchanger 40 corresponds to FIG. 6a.

FIG. 7b differs in that a branch A2 downstream of high-pressure chiller 12 is used to provide refrigerant to interior heat exchanger 40 and to supply it to motive mass inlet 32 of second ejector 31.

Figure 8A:
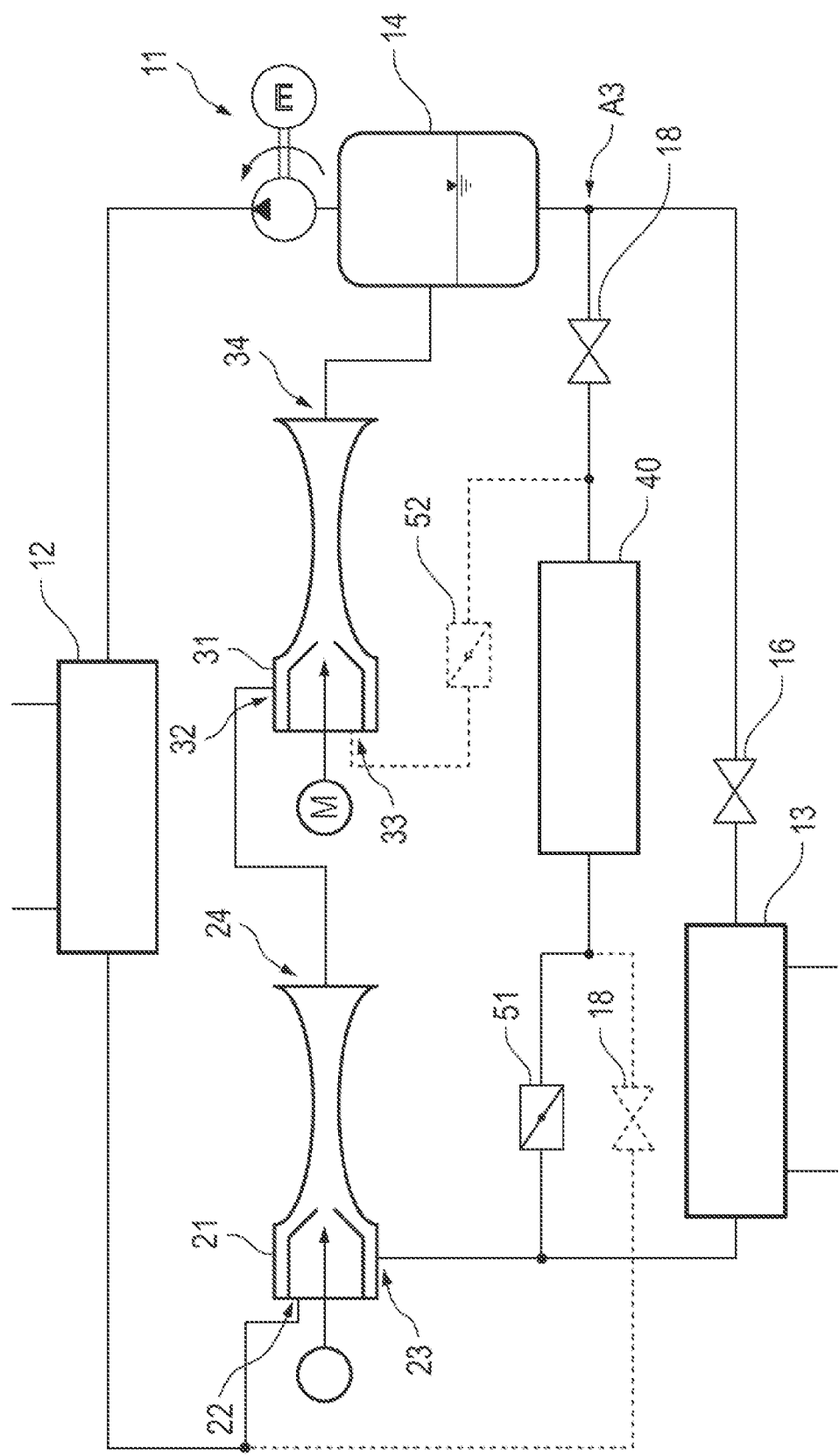
FIGS. 8a and 8b show schematic representations of a climate control device according to an eighth exemplary embodiment in an air conditioning mode and in a heat pump mode.
Figure 8B:
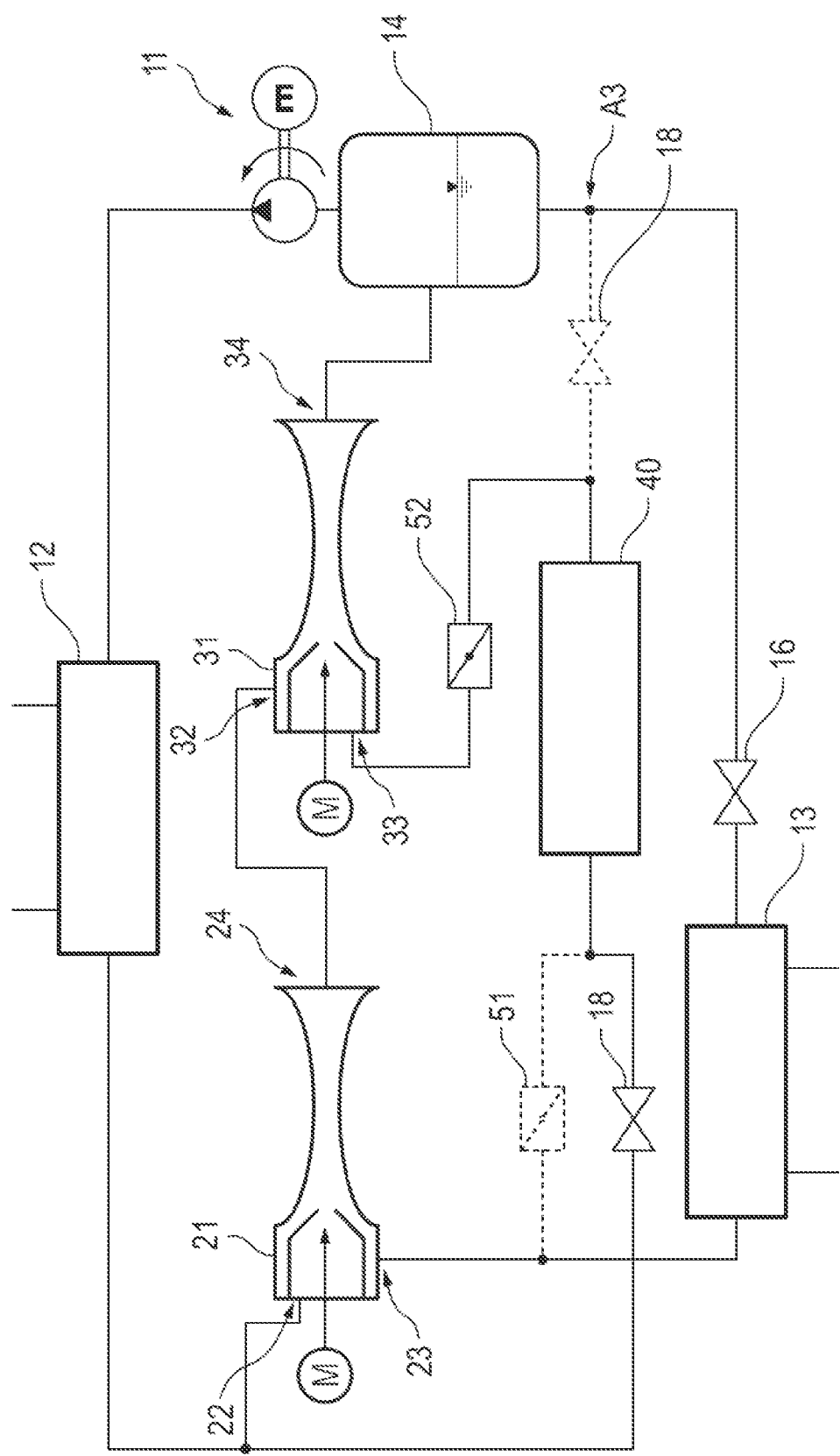

FIG. 8a and FIG. 8b are schematic representations of a climate control device 10 according to an eighth exemplary embodiment in an air conditioning mode and in a heat pump mode. The eighth exemplary embodiment is based on the second exemplary embodiment and has been supplemented by second ejector 31, which is arranged in parallel to an interior heat exchanger 40. Interior heat exchanger 40 replaces interior evaporator 15 in this case.

In the cooling mode, interior heat exchanger 40 is supplied with refrigerant via a third branch A3, which is located between low-pressure chiller 13 and liquid separator 14. Interior heat exchanger 40 opens into suction mass port 23 of first ejector 21.

In the heat pump mode, which is illustrated in FIG. 8b, interior heat exchanger 40 is connected to suction mass port 33 of second ejector 31 in parallel to motive mass port 22 of first ejector 21. In the heat pump mode, interior heat exchanger 40 can be connected in parallel to high-pressure chiller 12 via branch A2 and used to heat vehicle interior 110.

In the cooling mode of climate control device 10, an expansion valve 18 is connected upstream of interior heat exchanger 40.

Additional gas coolers 41 are used in the following exemplary embodiments shown in FIGS. 9 to 12. These additional gas coolers 41 can be positioned in a front end of motor vehicle 100, for example. In this regard, a direct heat transfer between the refrigerant and an environment is possible. In this regard, depending on the design, an optional interior heat exchanger 17 can also be used.

Figure 9A:
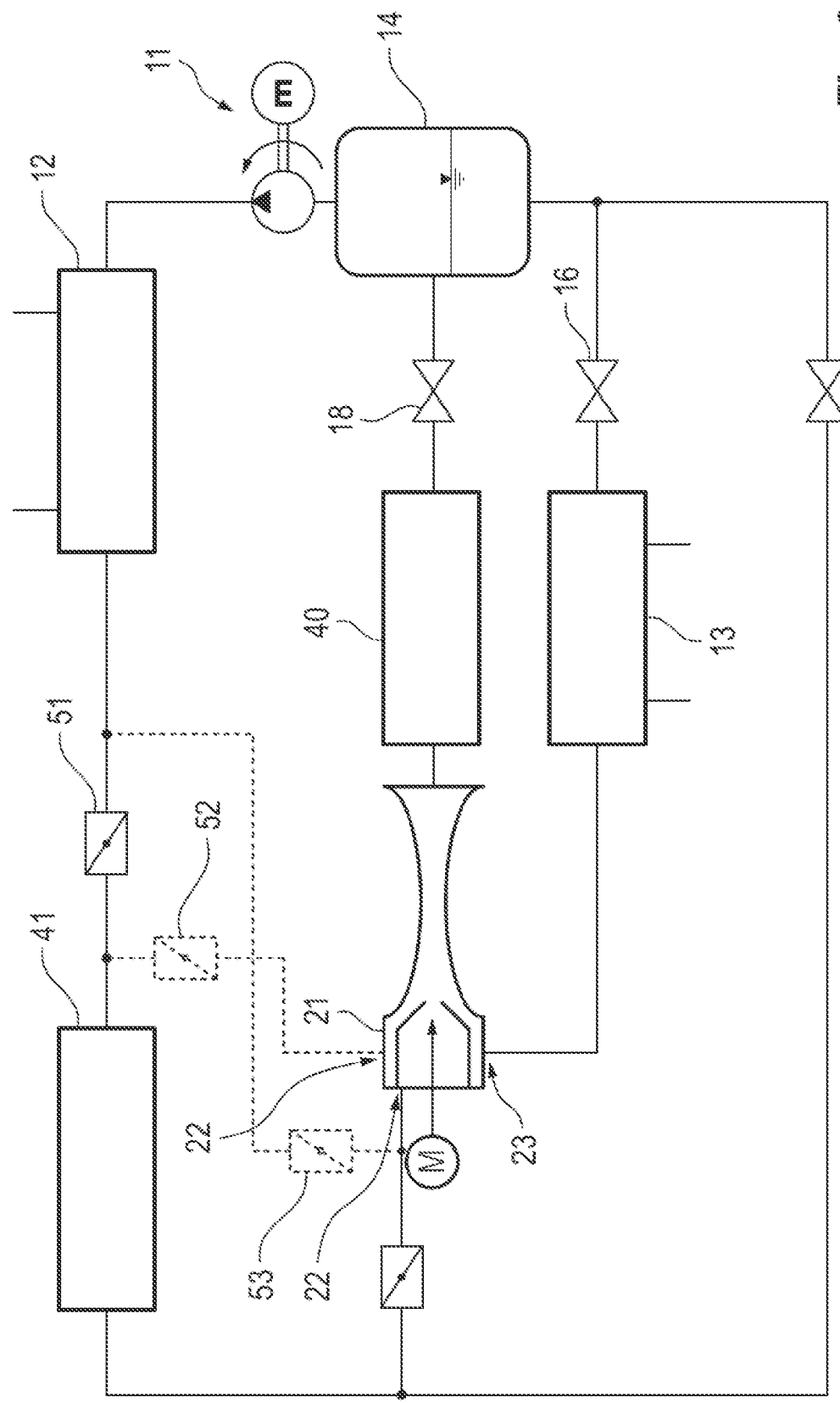
FIGS. 9a and 9b show schematic representations of a climate control device according to a ninth exemplary embodiment in an air conditioning mode and in a heat pump mode.
Figure 9B:
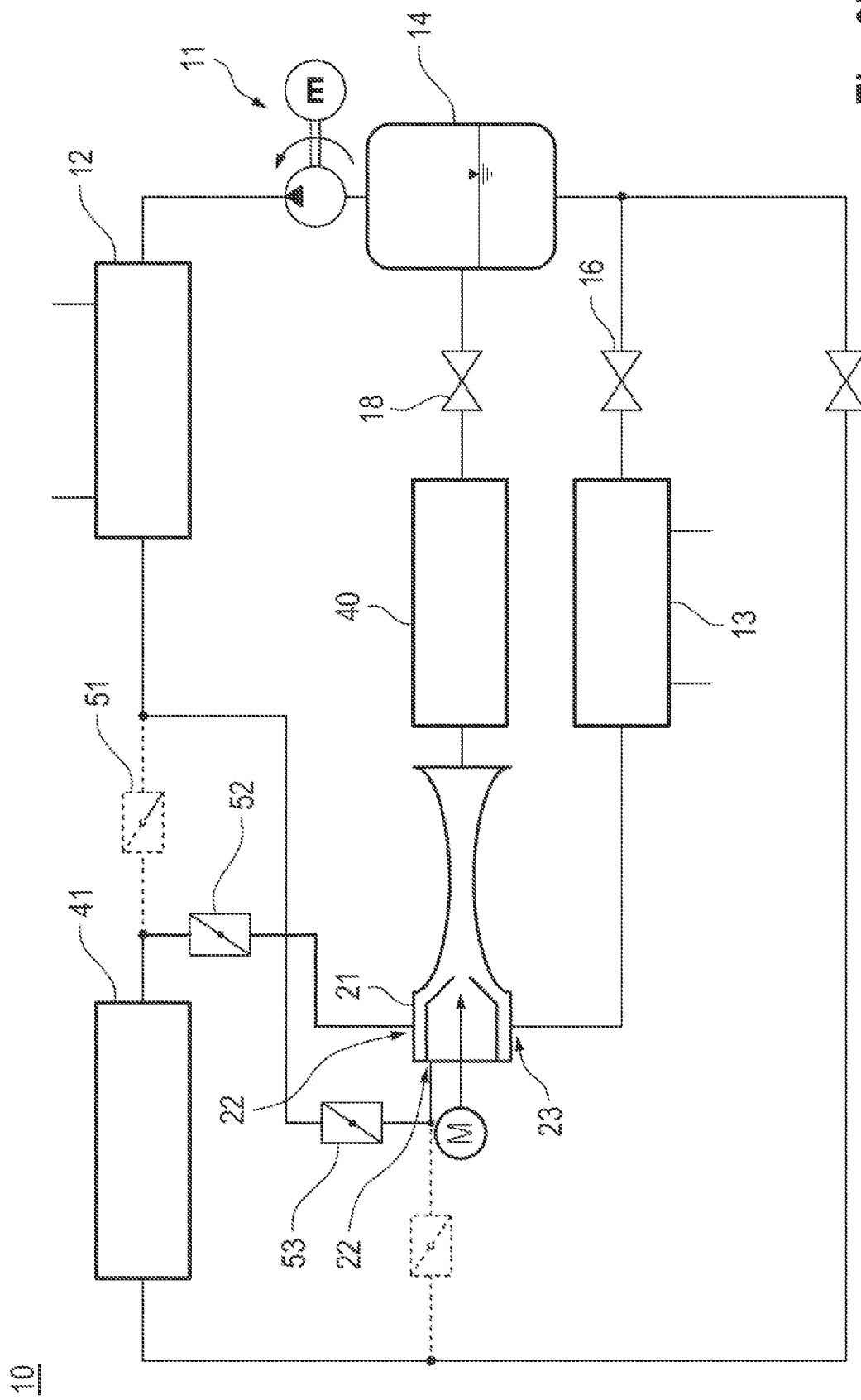

In FIG. 9a and FIG. 9b, schematic representations of a climate control device 10 according to a ninth exemplary embodiment are shown in an air conditioning mode and in a heat pump mode. The ninth exemplary embodiment is substantially based on the first exemplary embodiment and has been expanded by gas cooler 41, which is integrated into the refrigerant circuit in series with the refrigerant outlet of high-pressure chiller 12.

A refrigerant outlet of gas cooler 41 is connected both to motive mass inlet 22 of first ejector 21 and to the refrigerant outlet, for liquid refrigerant, of liquid separator 14.

Preferably, a water heat exchanger or an air heater for the interior air of vehicle interior 110 can be provided to ensure the heating and reheating mode for air drying.

In the illustrated exemplary embodiment, three valves or shut-off valves 51, 52, 53 are required to selectively drive first ejector 21 with the refrigerant exiting gas cooler 41 or exiting high-pressure chiller 12.

Figure 10A:
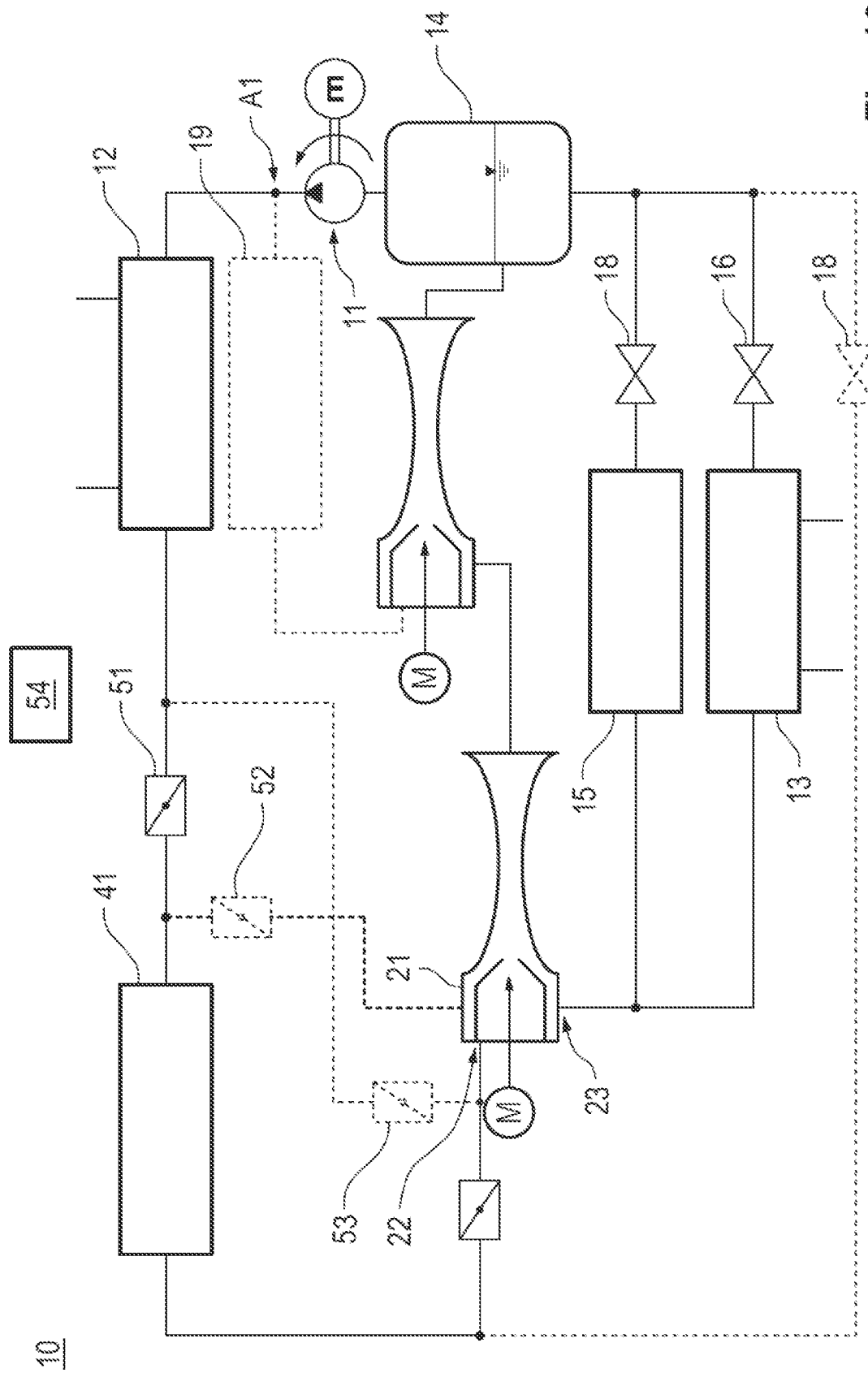
FIGS. 10a to 10c show schematic representations of a climate control device according to a tenth exemplary embodiment in an air conditioning mode, in a heat pump mode, and in a reheating mode.
Figure 10B:
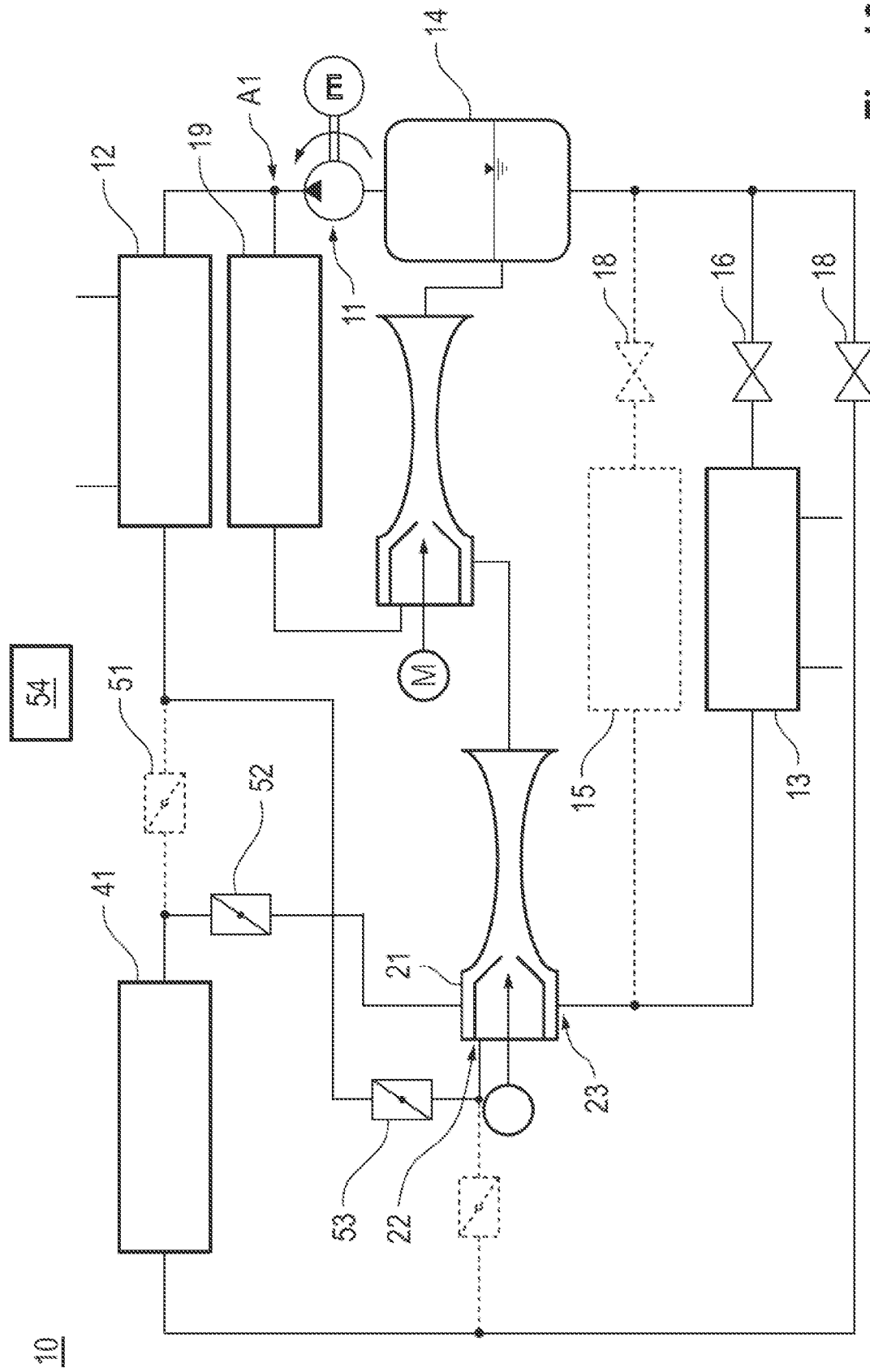
Figure 10C:
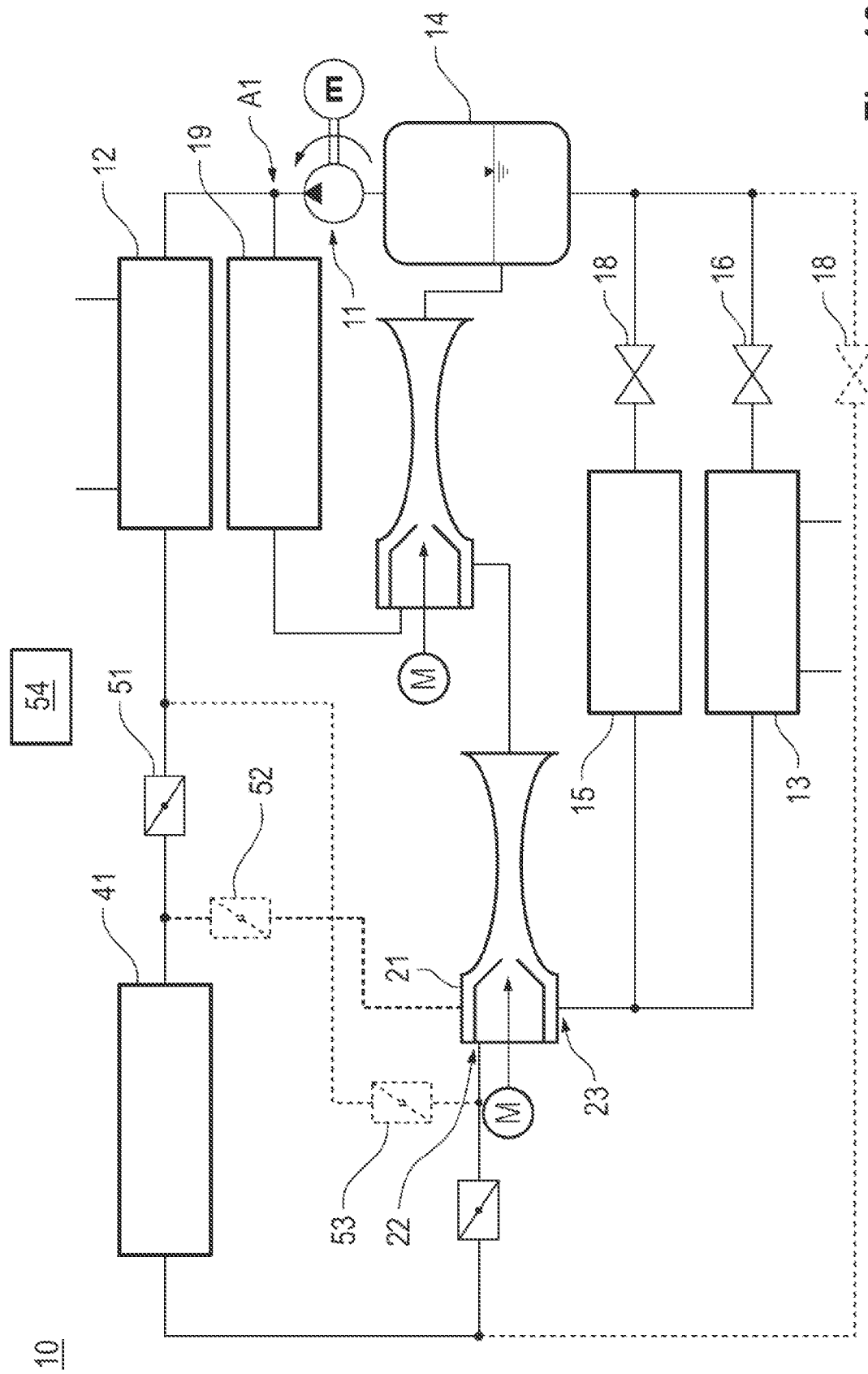

FIG. 10a, FIG. 10b, and FIG. 10c show schematic representations of a climate control device 10 according to a tenth exemplary embodiment in an air conditioning mode, a heat pump mode, and a reheating mode. Climate control device 10 according to the eighth exemplary embodiment is based on the third exemplary embodiment and, analogous to the tenth exemplary embodiment, has three shut-off valves 51, 52, 53 to control the connection between high-pressure chiller 12 or gas cooler 41 with first ejector 21.

Preferably, the respective shut-off valves 51, 52, 53 can be controlled by a control unit 54 which, for example, can also control expansion valves 16, 18.

In the tenth exemplary embodiment, heating as well as cooling and reheating are realized by direct heat transfer from the refrigerant circuit to vehicle interior 110.

A further expansion valve 18, which is used in the heat pump mode, is connected downstream of gas cooler 41. Refrigerant flows through interior condenser 19 via shut-off valves 51, 52, 53 in the heat pump mode and in the reheating mode in order to provide a heat output for vehicle interior 110.

In the air conditioning mode of climate control device 10, interior condenser 19 is decoupled from the refrigerant circuit, and only interior evaporator 15 is used to generate a cooling output.

Figure 11A:
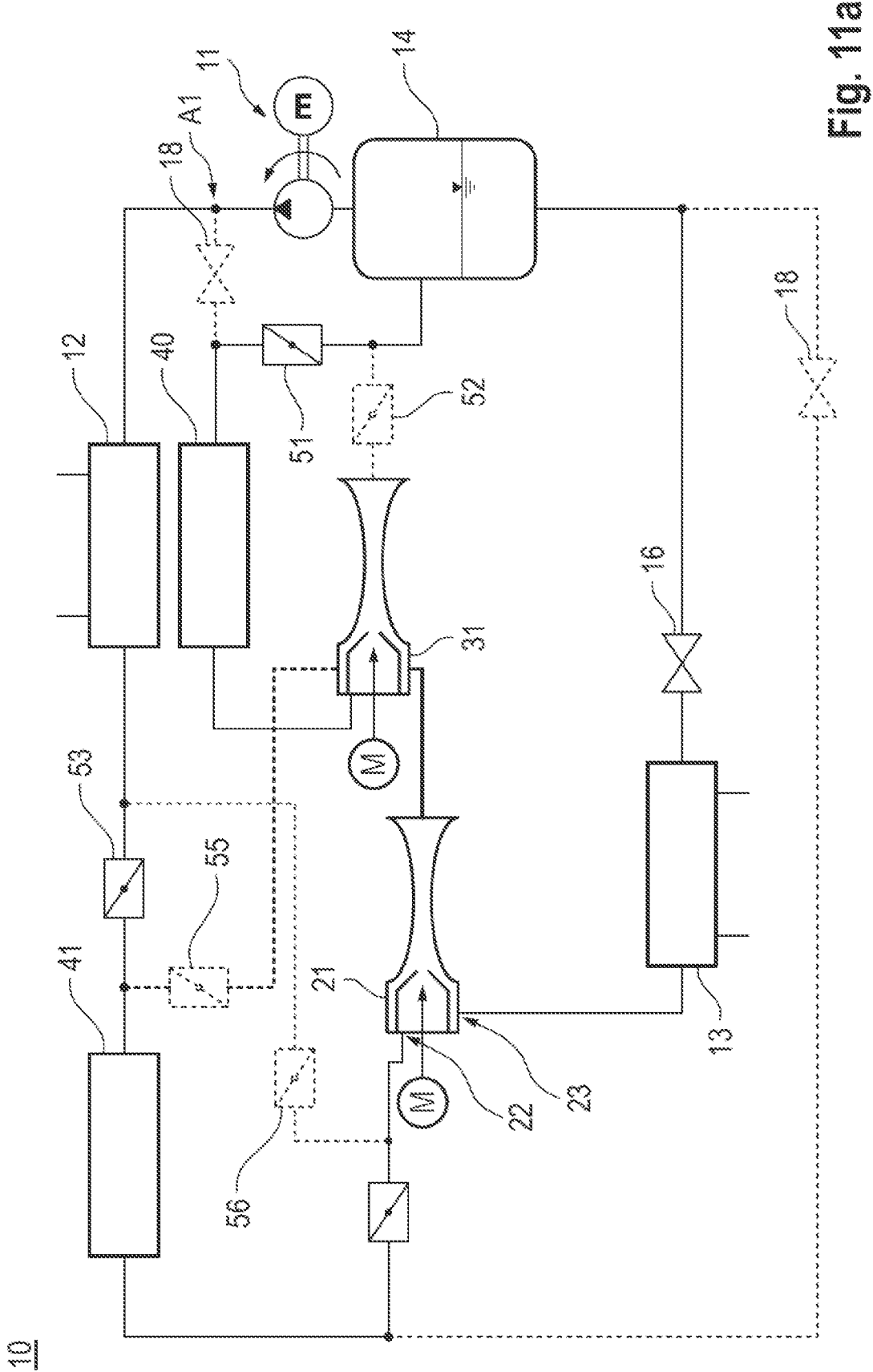
FIGS. 11a and 11b show schematic representations of a climate control device according to an eleventh exemplary embodiment in an air conditioning mode and in a heating mode.
Figure 11B:
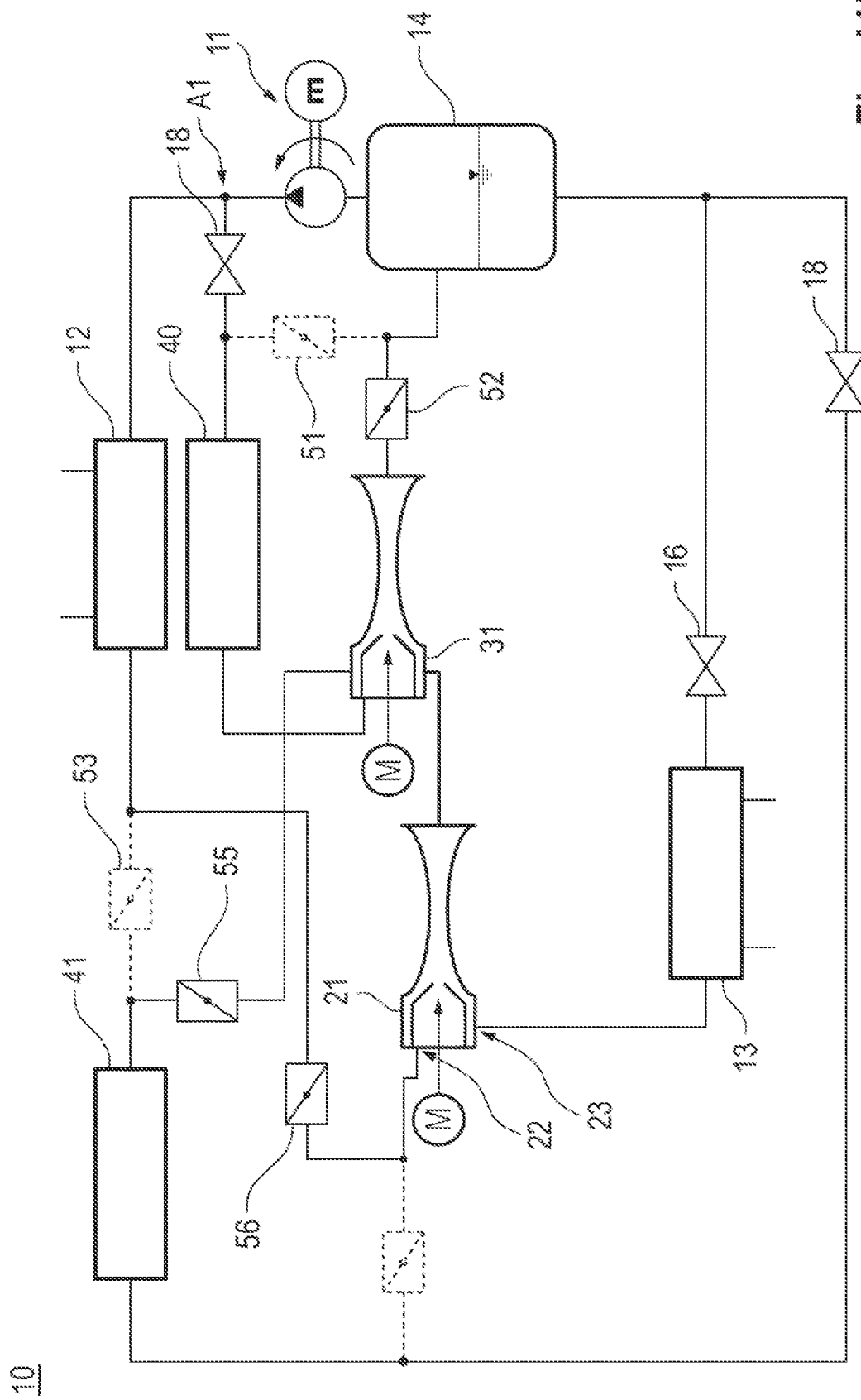

FIG. 11a and FIG. 11b show schematic representations of a climate control device 10 according to an eleventh exemplary embodiment in an air conditioning mode and in a heating mode. The eleventh exemplary embodiment of climate control device 10 is based on the sixth exemplary embodiment. Analogous to this, depending on whether interior heat exchanger 40 is supplied with refrigerant via branch A1 downstream of compressor 11 or via liquid separator 14, a heat output or a cooling output can be generated in interior heat exchanger 40 and discharged to vehicle interior 110.

Due to the additional gas cooler 41, three further shut-off valves 53, 55, 56 are required in addition to the already present two shut-off valves 51, 52 to control the refrigerant flow.

Figure 12B:
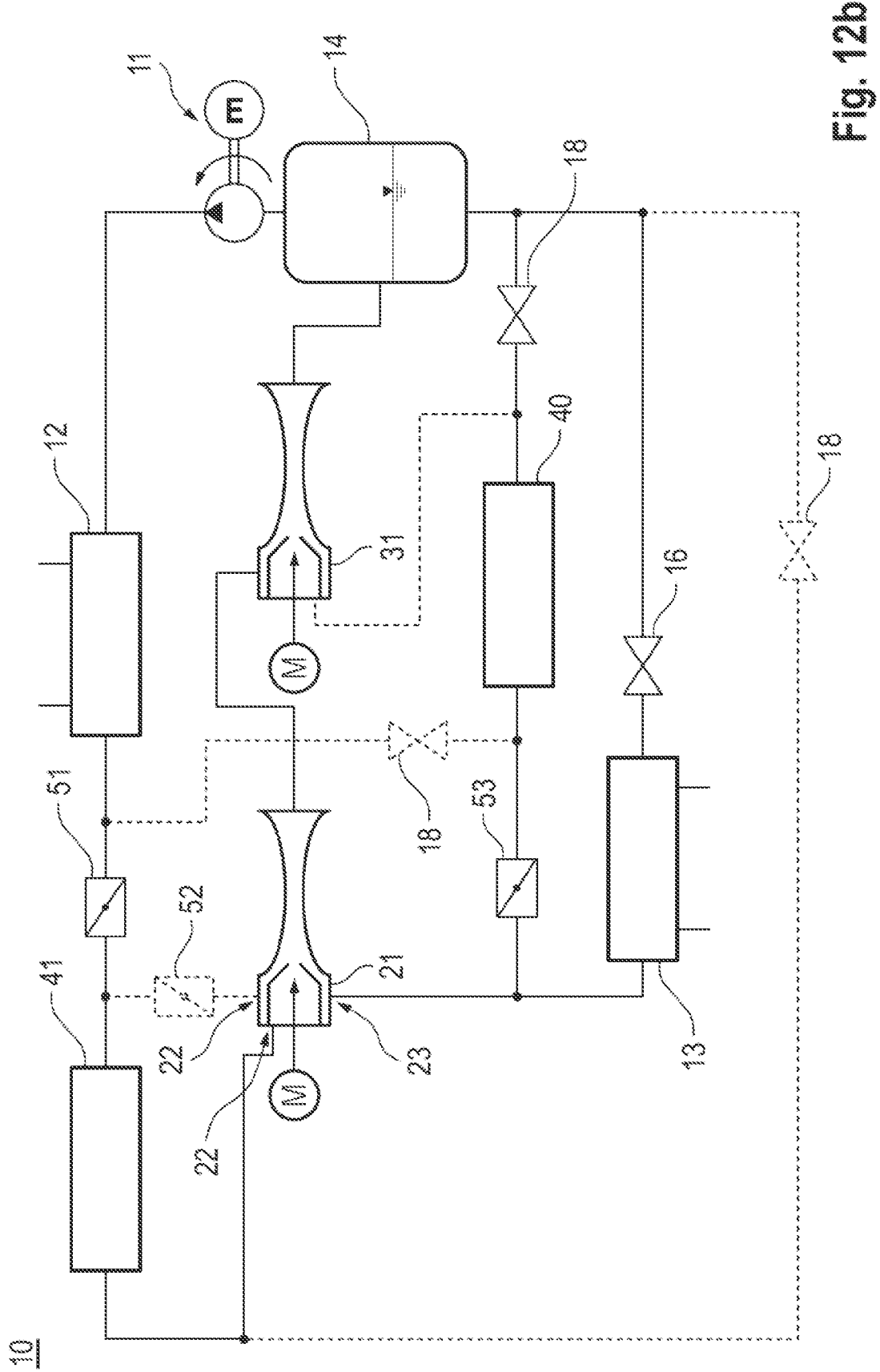

FIG. 12a and FIG. 12b show schematic representations of a climate control device 10 according to a twelfth exemplary embodiment in an air conditioning mode and in a heating mode. The twelfth exemplary embodiment is based on the seventh exemplary embodiment and is also supplemented by gas cooler 41.

Interior heat exchanger 40 can optionally be connected in series to high-pressure chiller 12 in order to heat vehicle interior 110 in the heat pump mode.

An optional water heat exchanger or an air heater for the interior air is provided to ensure the reheating mode for air drying.

FIG. 13 shows a side view of a motor vehicle 100 of the invention according to an exemplary embodiment with a climate control device 10 of the invention. Motor vehicle 100 is preferably designed as an electric vehicle or BEV and has a vehicle interior 110 which can be heated, cooled, or dehumidified by climate control device 10.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A climate control system for heating or cooling a space, the climate control system comprising:
a compressor to convey a refrigerant;
a high pressure chiller or a gas cooler and/or an interior condenser being arranged downstream of the compressor to cool the refrigerant; and
a low-pressure chiller arranged upstream of the compressor to heat the refrigerant,
wherein a refrigerant exiting from the high-pressure chiller is supplied to a motive mass inlet of a first ejector,
wherein a refrigerant exiting from the low-pressure chiller is supplied to a suction mass inlet of the first ejector, wherein an outlet of the first ejector is connected directly or indirectly to a liquid separator, and wherein an interior evaporator is connected in parallel to the low-pressure chiller, and wherein an expansion valve is connected upstream of the interior evaporator and/or the low-pressure chiller.

2. The climate control system according to claim 1, wherein a refrigerant outlet of the high-pressure chiller or the gas cooler is thermally coupled to a refrigerant inlet of the compressor via an interior heat exchanger.

3. The climate control system according to claim 1, wherein a refrigerant outlet of the gas cooler is connected to the motive mass inlet of the first ejector.

4. A motor vehicle comprising a climate control system according to claim 1.

5. A climate control system for heating or cooling a space, in particular a vehicle interior, the climate control system comprising:
   a compressor to convey a refrigerant;
   a high pressure chiller or a gas cooler and/or an interior condenser being arranged downstream of the compressor to cool the refrigerant; and
   a low-pressure chiller arranged upstream of the compressor to heat the refrigerant,
   wherein a refrigerant exiting from the high-pressure chiller is supplied to a motive mass inlet of a first ejector,
   wherein a refrigerant exiting from the low-pressure chiller is supplied to a suction mass inlet of the first ejector,
   wherein an outlet of the first ejector is connected directly or indirectly to a liquid separator, and
   wherein the outlet of the first ejector is indirectly connected to the liquid separator via a second ejector, wherein the outlet of the first ejector is connected to a suction mass inlet of the second ejector and the outlet of the second ejector is connected to the liquid separator.

6. The climate control system according to claim 5, wherein a branch arranged downstream of the compressor or upstream of the compressor or downstream of the high-pressure chiller is connected directly or via an interior condenser or via an interior heat exchanger to a motive mass inlet of the second ejector or to a motive mass inlet of the first ejector.

7. A climate control system for heating or cooling a space, in particular a vehicle interior, the climate control system comprising:
   a compressor to convey a refrigerant;
   a high pressure chiller or a gas cooler and/or an interior condenser being arranged downstream of the compressor to cool the refrigerant; and
   a low-pressure chiller arranged upstream of the compressor to heat the refrigerant,
   wherein a refrigerant exiting from the high-pressure chiller is supplied to a motive mass inlet of a first ejector,
   wherein a refrigerant exiting from the low-pressure chiller is supplied to a suction mass inlet of the first ejector,
   wherein an outlet of the first ejector is connected directly or indirectly to a liquid separator, and
   wherein the gas cooler is connected between the refrigerant outlet of the high-pressure chiller and the motive mass inlet of the first ejector or between the refrigerant outlet of the liquid separator and the motive mass inlet of the first ejector.

8. The climate control system according to claim 7, wherein the outlet of the first ejector is connected to a motive mass inlet of the second ejector, and wherein a refrigerant flows through an interior heat exchanger branched off downstream of the high pressure chiller and is connected to the suction mass inlet of the second ejector.

\* \* \* \* \*